May 3, 1932. J. L. DRAKE 1,856,128
GLASS CUTTING APPARATUS
Original Filed April 13, 1927
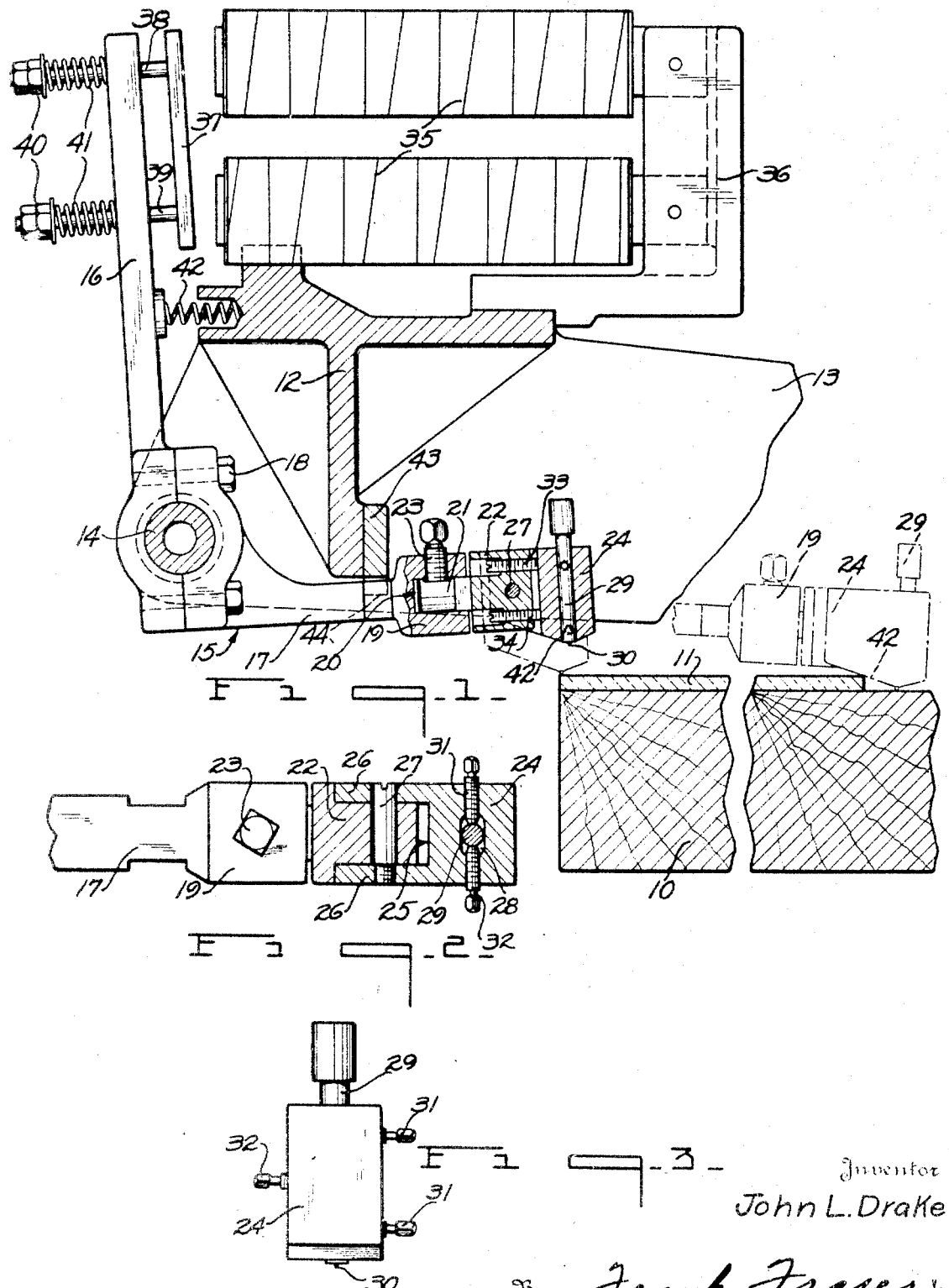
Inventor
John L. Drake
By Frank Fraser,
Attorney Patented May 3, 1932

1,856,128

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

GLASS CUTTING APPARATUS

Original application filed April 13, 1927, Serial No. 183,428. Divided and this application filed February 11, 1928. Serial No. 253,670.

This application is a division of my copending application entitled "Sheet glass cutting apparatus" filed April 13, 1927 Serial No. 183,428.

This invention relates broadly to apparatus for cutting flat sheets or plates of any desired material but is especially designed for and finds its greatest utility in the cutting of glass sheets when incorporated in the type of machine illustrated and described in my copending application referred to above. More particularly the present invention relates to a novel form of cutting mechanism whereby the cutting tool is capable of a plurality of individual and independent adjustments which provide for any desired accurate setting thereof.

An object of the invention is to provide cutting mechanism of this character having means for yieldably maintaining the cutting tool in engagement with the glass to automatically compensate for any inequalities in the surface thereof. Another object is to provide means whereby the cutting mechanism will automatically adjust itself to glass sheets of different thicknesses without previous manual manipulation. A further object is to so design the cutting mechanism that the cutting tool will be caused to gradually ride up upon the sheet in order to prevent said tool from striking against and chipping or marring the edges of said sheet or being injured thereby.

Other objects and advantages of the invention will become more apparent during the course of the following description when taken in connection with the accompanying drawings.

In the drawings forming a part of this application and wherein like numerals are employed to designate like parts through the same, Fig. 1 is a side elevation, partially in section, of the cutting mechanism and associated parts of the apparatus.

Fig. 2 is a horizontal transverse section through a portion of the cutter, and

Fig. 3 is a front view of the cutting tool holder.

In the drawings there is shown diagrammatically at 10, the top of a table or other suitable support upon which the glass sheet 11 to be cut is placed. The numeral 12 designates a cutter carrying cross member or beam extending transversely above the table 10, the opposite ends of said cross member being preferably supported by carriages or trucks 13 mounted upon rails or the like (not shown) and movable back and forth across the table in a manner and by means more specifically described and claimed in my copending application.

Extending between and carried by the carriages 13 at the opposite sides of table 10 is a shaft 14 upon which are mounted a plurality of cutters one being herein shown for the purposes of illustration and designated in its entirety by the numeral 15. Each cutter 15 comprises a substantially vertical arm 16 and a substantially horizontal tool supporting arm 17, the adjacent ends of said arms being provided with recesses adapted to the shaft 14 and to which the said arms are pivotally secured by means of bolts or the like 18.

The forward free end of the tool supporting arm 17 is formed with a head 19 having a socket 20 therein for the reception of stud 21 carried by block or member 22. This block 22 is secured in position and prevented from turning by means of a set screw 23, said screw passing through head 19 and engaging stud 21. The numeral 24 designates the cutting tool holder proper which is recessed as at 25 to provide the resultant extensions 26 which overlap the opposite sides of block 22 as shown particularly in Fig. 2. A pivot pin 27 passing through the said extensions 26 and block 22 serve to pivotally secure the tool holder 24 to said block.

The holder 24 is provided with an opening 28 extending vertically therethrough and within which is received the tool 29 carrying at its lower end, as herein shown, a cutting diamond or the like 30 although a steel cutting wheel or disc may be employed if desired. The tool 29 is secured within opening 28 by means of set screws 31 and 32 passing through said holder and engaging the same at diametrically opposite points. Two set screws 31 are preferably provided and are adapted to engage the tool at one side thereof adjacent its upper and lower ends while but a single set screw 32 is employed, said screw being adapted to engage the tool at the opposite side thereof and approximately intermediate its ends.

It will be noted that the opening 28 in tool holder 24 is substantially elliptical with its major axis extending transversely thereof. Thus, upon proper adjustment of the set screws 31 and 32, the tool 29 can be moved either to one side or the other of the holder. Also, upon proper adjustment of the set screws 31 the angle of the tool with respect to the glass sheet can be varied as desired, the single set screw 32 serving as a fulcrum about which the said tool can be rocked.

Further, the tool can be adjusted vertically within the opening 28 and the tool holder and block 22 may be rotated as a unit on stud 21 upon loosening of screw 23. Passing horizontally through the block 22 and engaging holder 24 above and beneath the pivot pin 27 are adjusting screws 33 and 34 respectively, and by loosening one of these screws and tightening the other, the tool holder and tool carried thereby can be swung either upwardly or downwardly through a vertically arcuate path. Thus, it will be apparent that there are provided a plurality of independent adjustments which facilitate accurate setting of the cutting tool.

As more particularly described in my co-pending application, the cutters 15 are adapted to be controlled by means of electro-magnets 35, a pair of these magnets being preferably though not necessarily provided for each cutter and upon energization thereof, the corresponding cutter or cutters 15 are adapted to be rocked on shaft 14 whereby the cutting tool 29 will be lowered into operative or cutting position. The electro-magnets are herein shown as horizontally supported upon the cross member 12 with one of their ends secured within a bracket member or the like 36. Carried at the upper end of the vertical arm 16 of each cutter 15 is a plate 37 adapted to be attracted towards and held in engagement with the electro-magnets 35 upon energization thereof. The plate 37 is secured to the inner ends of rods 38 and 39 which pass through arm 16 and have threaded upon their outer ends suitable nuts or the like 40. Encircling rods 38 and 39 and bearing against arm 16 and nuts 40 are compression springs 41 which serve to yieldably maintain the cutting tool in engagement with the glass sheet during the cutting thereof whereby to automatically compensate for any inequalities in the surface thereof and further to maintain a constant pressure upon the glass to uniformly score the same. After the cutting of the sheet has been completed, the electro-magnets are adapted to be de-energized whereupon the spring 42 bearing against arm 16 will urge the same outwardly thereby causing the cutter to rock in the opposite direction on shaft 14 to raise the cutting tool out of engagement with the glass or into its non-cutting position.

As shown particularly in Fig. 1 the tool holder 24 is provided with an inclined bottom 42 which serves to guide the cutting diamond up on the sheet and thereby prevent the same from striking against and chipping or otherwise marring the edges of said sheet or being injured thereby. Thus this inclined bottom acts as a guard to protect both the sheet and tool and also allows the latter to automatically adjust itself to different thicknesses of sheet without previous manual manipulation.

The cross member 12 carries at its lower end a plate 43 provided in its bottom edge with a series of notches 44 which receive the tool supporting arms 17 of cutters 15 so as to steady the same and prevent any lateral movement thereof.

It is to be understood that the form of the invention herewith shown and described is to be taken as the preferred embodiment of the same, and that various changes in the shape, size and arrangement or parts may be resorted to without departing from the spirit of the invention or the scope of the subjoined claims.

I claim:

1. In glass cutting apparatus, cutting mechanism including a support, a holder, a member interposed between said holder and support and carried by the latter, means for pivotally mounting said holder to said member, and adjusting screws passing horizontally through said member and engaging said holder above and beneath the pivot point thereof for locking the same upwardly or downwardly through a vertically arcuate path.

2. In glass cutting apparatus, cutting mechanism including a support, a holder, a member interposed between said holder and support and removably carried by the latter, means for pivotally mounting said holder to said member, said holder having an opening extending vertically therethrough with its major axis arranged transversely thereof, a tool received within said opening, adjusting screws passing through said holder and engaging said tool at diametrically opposite points to effect adjustment thereof with respect to said holder, and adjusting screws passing horizontally through said member and engaging said holder to rock the same either upwardly or downwardly through a vertically arcuate path.

3. In sheet glass cutting apparatus, a cutter including a supporting member, a block removably carried thereby, a cutting tool, a holder for the tool having an opening therethrough for receiving the same, adjusting screws passing through the holder and engaging opposite sides of said tool to secure the same in position, and for adjusting the angle thereof laterally with respect to the sheet, and adjusting screws carried by said block and engaging said holder for adjusting the angle of said tool in a direction at substantially right-angles to the first adjustment.

4. In sheet glass cutting apparatus, a pivotally mounted substantially horizontal supporting arm having a socket in its forward end, a member having a stud rotatably received within the socket, means for securing the stud in fixed position within said socket, a tool holder pivotally mounted to said member to swing about a substantially horizontal axis, said tool holder having a vertical opening therethrough, a cutting tool received within the vertical opening, means passing through said holder and engaging said tool for adjusting the angle thereof transversely with respect to the holder and for also adjusting the tool bodily with respect to said holder, and means carried by said member and engaging the holder above and beneath its pivotal point to effect adjustment of said holder and cutting tool through a substantially vertical arc.

5. In sheet glass cutting apparatus, a pivotally mounted substantially horizontal supporting arm having a socket in its forward end, a member having a stud rotatably received within the socket, means for securing the stud in fixed position within said socket, a tool holder pivotally mounted to said member to swing about a substantially horizontal axis, said tool holder having a vertical opening therethrough, a cutting tool received within the vertical opening, adjusting screws passing through said holder and engaging said tool at diametrically opposite points for adjusting the angle thereof transversely with respect to the holder and for also adjusting the tool bodily with respect to said holder, and adjusting screws passing horizontally through said member and engaging said holder above and beneath the pivot point thereof for rocking the same and the cutter upwardly or downwardly through a vertically arcuate path.

6. In glass cutting apparatus, cutting mechanism including a support, a holder, a cutting tool carried by said holder, a member interposed between the holder and support and carried by the latter, means for pivotally mounting said holder to said member, and means carried by said member and engaging the holder above and beneath its pivotal point to effect adjustment of said holder and cutting tool through a substantially vertical arc.

Signed at Toledo, in the county of Lucas and State of Ohio, this 8th day of February, 1928.

JOHN L. DRAKE.